United States Patent Office 3,153,655
Patented Oct. 20, 1964

3,153,655
4-(γ-OXOBUTYL)-1,2-DIPHENYL-3,5-DIOXO-PYRAZOLIDINE DERIVATIVES
Josef Čtvrtník and Jiří Mayer, Olomouc, and Oldřich Němeček, Prague, Czechoslovakia, assignors to Spofa Sdruzeni podniku pro zdravotnickou vyrobu, Prague, Czechoslovakia
No Drawing. Filed Oct. 3, 1962, Ser. No. 228,032
Claims priority, application Czechoslovakia, Oct. 5, 1961, PV 5,913/61; Feb. 17, 1962, PV 1,033/62
3 Claims. (Cl. 260—310)

The invention relates to the preparation of new 4-(γ-oxobutyl)-1,2-diphenyl-3,5-dioxopyrazolidine derivatives and salts thereof, having the general formula

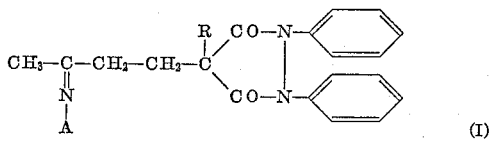
(I)

wherein R represents hydrogen or a cation of an inorganic or organic base, and A represents the radical

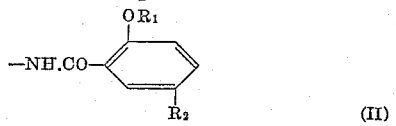
(II)

wherein $R_1$ stands for hydrogen or acetyl, and $R_2$ for hydrogen or a hydroxyl group.

The new derivatives of the present invention exhibit a high anti-phlogistic efficacy in experimental arthritis in rats, together with low toxicity and fair compatibility. The new compounds can be used for therapeutic purposes either as such, or in the form of salts thereof with inorganic or organic bases.

According to the invention, these new compounds can be prepared by the condensation of 4-(γ-oxobutyl)-1,2-diphenyl-3,5-dioxo-pyrazolidine, or of a salt thereof with an inorganic or organic base, with a compound of the general formula:

$$H_2N—A \qquad (III)$$

wherein A has the same definition as above.

As compounds of general Formula III, hydrazides of salicylic acid, of acetylsalicylic acid or of gentisic acid can be used.

The condensation is expediently performed in the presence of an alkanol of 1-4 carbon atoms, such as methanol or ethanol, at boiling temperature of the mixture.

In performing the method according to the invention, the starting components are dissolved or suspended in methanol or ethanol, and the mixture is boiled under reflux for a few hours. By cooling down the reaction mixture, the desired product is eliminated in crystalline form. It is isolated in simple manner by suction filtration, and purified by recrystallization from a suitable solvent, e.g. dilute ethanol. The process is very simple and gives good yields.

For the manufacture of medicine forms the new compounds can be used either in the form of the acid, or of a salt with inorganic bases. The salts can be prepared for example by dissolving the compounds of the general formula I in aqueous or alcoholic solution of an equivalent amount of alkali metal hydroxide, or in alcoholic solution of an equivalent amount of alkali metal alcoholate, or of an organic base, respectively, e.g. N-methyl-D-glucamine.

Examples (1) A mixture of 5 g. of salicylic acid hydrazide and 10 g. of 4-(γ-oxobutyl)-1,2-diphenyl-3,5-dioxopyrazolidine in 75 ml. methanol is stirred and boiled under reflux for 2 hours. The reaction mixture is then cooled down, the crystals thus eliminated are filtered by suction, washed with methanol and dried. The yield is about 12 g. The resulting product 4-(γ-oxobutyl)-1,2-diphenyl-3,5-dioxopyrazolidine-salicylic acid hydrazone is in the form of colourless crystals, which on recrystallization from ethanol melt at 164–165° C.

(2) A mixture of 12 g. gentisic acid hydrazide and 22 g. of 4-(γ-oxobutyl)-1,2-diphenyl-3,5-dioxopyrazolidine in 150 ml. ethanol is stirred and boiled under reflux for 6 hours. The crystals eliminating by cooling down the reaction mixture are filtered off by suction, washed with ethanol and dried. Yield is about 30 g. After recrystallization from butanol, the compound 4-(γ-oxobutyl)-1,2-diphenyl-3,5-dioxopyrazolidine-gentisic acid hydrazone melts at 140–143° C.

What we claim is:
1. A compound selected from the group consisting of the compounds of the formula:

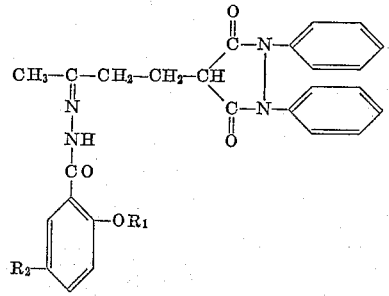

wherein $R_1$ is selected from the group consisting of hydrogen and acetyl, and wherein $R_2$ is selected from the group consisting of hydrogen and hydroxyl; and physiologically compatible salts thereof.

2. 4-(γ-oxobutyl)-1,2-diphenyl-3,5-dioxopyrazolidine-salicylic acid hydrazone.

3. 4-(γ-oxobutyl)-1,2-diphenyl-3,5-dioxopyrazolidine-gentisic acid hydrazone.

References Cited in the file of this patent

FOREIGN PATENTS 781,439    Great Britain _____ Aug. 21, 1957

OTHER REFERENCES

Čtvrtník et al.: Chemical Abstracts, vol. 53, 1313e (1959).

Denss et al.: Helvetica Chimica Acta, vol. 40, pp. 402–407 (1957).

Shriner et al.: The Systematic Identification of Organic Compounds, 4th ed., pp. 254–55, New York, Wiley, 1956.

Strain: Jour. Amer. Chem. Soc., vol. 57, pp. 758–61 (1935).

Wild: Characterisation of Organic Compounds, pp. 110–21, Cambridge, University Press, 1948.